United States Patent [19]

Anderson

[11] Patent Number: 4,788,890
[45] Date of Patent: Dec. 6, 1988

[54] PERFORMANCE CONTROL OF A MOTOR VEHICLE ENGINE FOR CONSISTENT HIGH QUALITY TRANSMISSION SHIFTING

[75] Inventor: Charlie E. Anderson, Fenton, Mich.

[73] Assignee: General Motors Corporation, Detroit, Mich.

[21] Appl. No.: 67,454

[22] Filed: Jun. 29, 1987

[51] Int. Cl.⁴ ............................................. B60K 41/04
[52] U.S. Cl. ........................................ 74/851; 74/866
[58] Field of Search ............... 74/851, 843, 853, 854, 74/858, 859, 866; 123/329, 413, 419, 422; 364/424.1

[56] References Cited

U.S. PATENT DOCUMENTS

| | | | |
|---|---|---|---|
| 3,792,630 | 2/1974 | Hause | 74/851 X |
| 3,835,733 | 9/1974 | Wurst | 74/866 |
| 3,942,393 | 3/1976 | Forster et al. | 74/866 |
| 3,956,947 | 5/1976 | Leising et al. | 74/866 |
| 4,226,141 | 10/1980 | Espenschied | 74/858 |
| 4,246,805 | 1/1981 | Umezawa | 74/851 |
| 4,266,447 | 5/1981 | Heess et al. | 74/858 |
| 4,270,414 | 6/1981 | Tellert | 74/851 X |
| 4,285,314 | 8/1981 | Kiencke et al. | 123/329 X |
| 4,355,550 | 10/1982 | Will et al. | 74/858 X |
| 4,370,904 | 2/1983 | Muller et al. | 74/858 |
| 4,403,527 | 9/1983 | Mohl et al. | 74/851 |
| 4,437,442 | 3/1984 | Yamaguchi | 123/329 X |
| 4,586,403 | 5/1986 | Lee et al. | 74/866 |

Primary Examiner—Allan D. Herrmann
Assistant Examiner—David Novais
Attorney, Agent, or Firm—Mark A. Navarre

[57] ABSTRACT

In a motor vehicle power train including an automatic transmission calibrated to provide high quality shifting at a specified engine performance level, an engine spark timing control system effective in the course of transmission shifting for bringing the actual engine acceleration into correspondence with a predefined engine acceleration. The predefined engine acceleration corresponds to the acceleration which would occur at the specified engine performance level upon which the transmission calibration is based. As a result, high quality transmission shifting is achieved despite engine performance level variations.

6 Claims, 6 Drawing Sheets

PERFORMANCE CONTROL OF A MOTOR VEHICLE ENGINE FOR CONSISTENT HIGH QUALITY TRANSMISSION SHIFTING

This invention relates to motor vehicle transmission shift control, and more particularly to a closed loop engine control for maintaining high shift quality despite variations in engine performance level.

BACKGROUND OF THE INVENTION

In motor vehicles having hydraulically regulated automatic shift transmissions, the various pressure control elements are sized (calibrated) relative to the nominal torque characteristic of the engine to yield acceptable shift quality for various driving and performance conditions. However, the range of variations can be quite broad, especially when the vehicle is operated at differing altitudes. As a result, a vehicle calibrated to deliver high quality shifting at relatively low altitudes may experience excessively harsh shifting at relatively high altitudes. Conversely, a vehicle calibrated to deliver high quality shifting at relatively high altitudes may experience excessive wearing of the clutch elements at relatively low altitudes. The vehicle is particularly sensitive to such variations when the shift involves the control of two clutch elements—that is, a clutch-to-clutch shift.

To overcome the engineering trade-off described above, it has been proposed to equip the transmission with relatively sophisticated electronic pressure control devices, and to actively control the clutch pressures in the course of a shift. While this approach can be used to successfully compensate for driving and performance variations, it often introduces stability concerns, and is not achieved without substantial expense.

SUMMARY OF THE PRESENT INVENTION

This invention is directed to an alternative approach which utilizes existing engine controls to compensate for the driving and performance variations. In this approach, the transmission controls are calibrated in a conventional manner in relation to a specified engine performance characteristic, and the engine controls are adjusted in the course of a shift to make the engine conform to the specified performance characteristic.

According to the present invention, the specified level of engine performance is predefined in terms of the engine acceleration that would occur in the course of transmission shifting. It corresponds to a relatively low performance level, as would be encountered at relatively high altitudes, and the transmission is calibrated to provide high quality shifting at that performance level. During the course of the shift, the engine spark timing is retarded as necessary so that the actual engine acceleration corresponds with the predefined acceleration value. As a result, the actual engine performance level conforms to the specified level, and high quality shifting is achieved in spite of substantial variations in the vehicle operating conditions. The amount of spark retard actually employed is limited by several operational constraints of the power train.

While the present invention is described herein primarily in terms of a clutch-to-clutch downshift, the control is equally applicable to upshift, and shifts involving the control of only a single clutch element.

BRIEF DESCRIPTION OF THE DRAWINGS

FIG. is a schematic diagram depicting a motor vehicle power train and a computer based engine control unit.

DETAILED DESCRIPTION OF THE DRAWINGS

Figure 1:
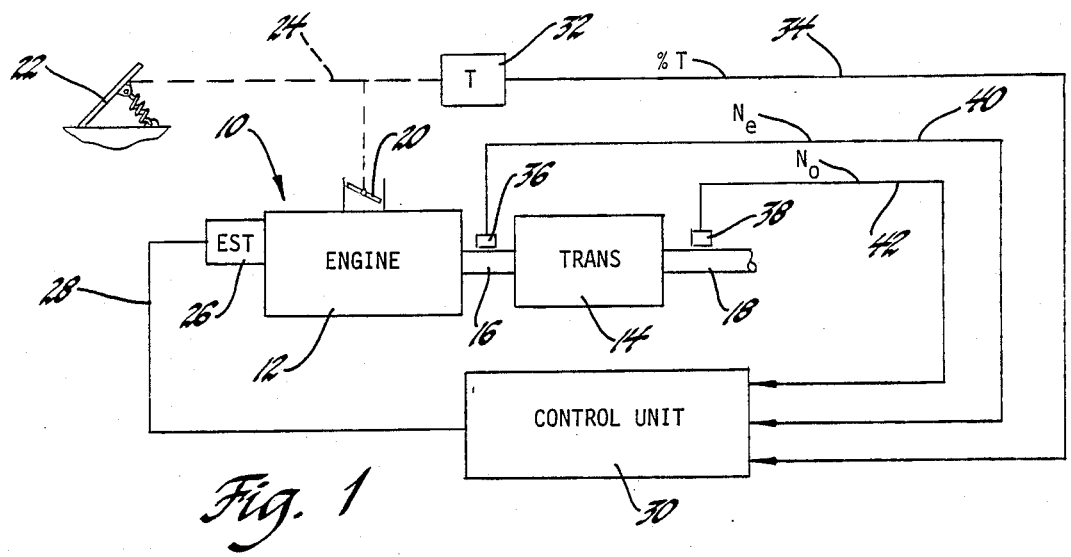

Referring to FIG. 1, the reference numeral 10 generally designates a motor vehicle power train comprising a spark ignition internal combustion (IC) engine 12, and a conventional hydraulically operated automatic transmission (TRANS) 14. The engine 12 drives the input of transmission 14 via the engine output shaft 16, and the transmission drives the vehicle wheels (not shown) via the transmission output shaft 18.

The engine fuel and spark timing are controlled in a conventional manner in response to a variety of operating parameters including the position of an engine throttle 20. The throttle 20 is positioned by an operator manipulated accelerator pedal 22 as indicated by the broken lines 24. An electronic spark timing unit (EST) 26 is responsive to a spark advance signal supplied thereto by line 28 and operates in a conventional manner to initiate combustion in the various engine cylinders in accordance with the spark advance signal. The spark advance signal on line 28 is generated by a computer based engine control unit 30 in response to a variety of input parameters including the position of the engine throttle 22, the rotational speed of the engine output shaft 16 and the rotational speed of the transmission output shaft 18. The throttle position is determined by a position transducer (T) 32, which provides an electrical signal %T in accordance therewith on line 34. The engine and transmission output speeds are detected by the speed transducers 36 and 38, respectively, which provide output signals $N_e$ and $N_o$ in accordance therewith on lines 40 and 42.

The engine control unit 30 operates as described below in response to the various inputs to control the engine spark timing via the EST unit 26 in the course of transmission shifting to bring the actual engine performance level into correspondence with a specified engine performance level. The transmission 14, in turn, is hydraulically and mechanically calibrated to provide high quality shifting at the specified engine performance level. In the absence of transmission shifting, the engine spark timing is controlled in a normal manner to provide optimum engine performance.

Figure 2:
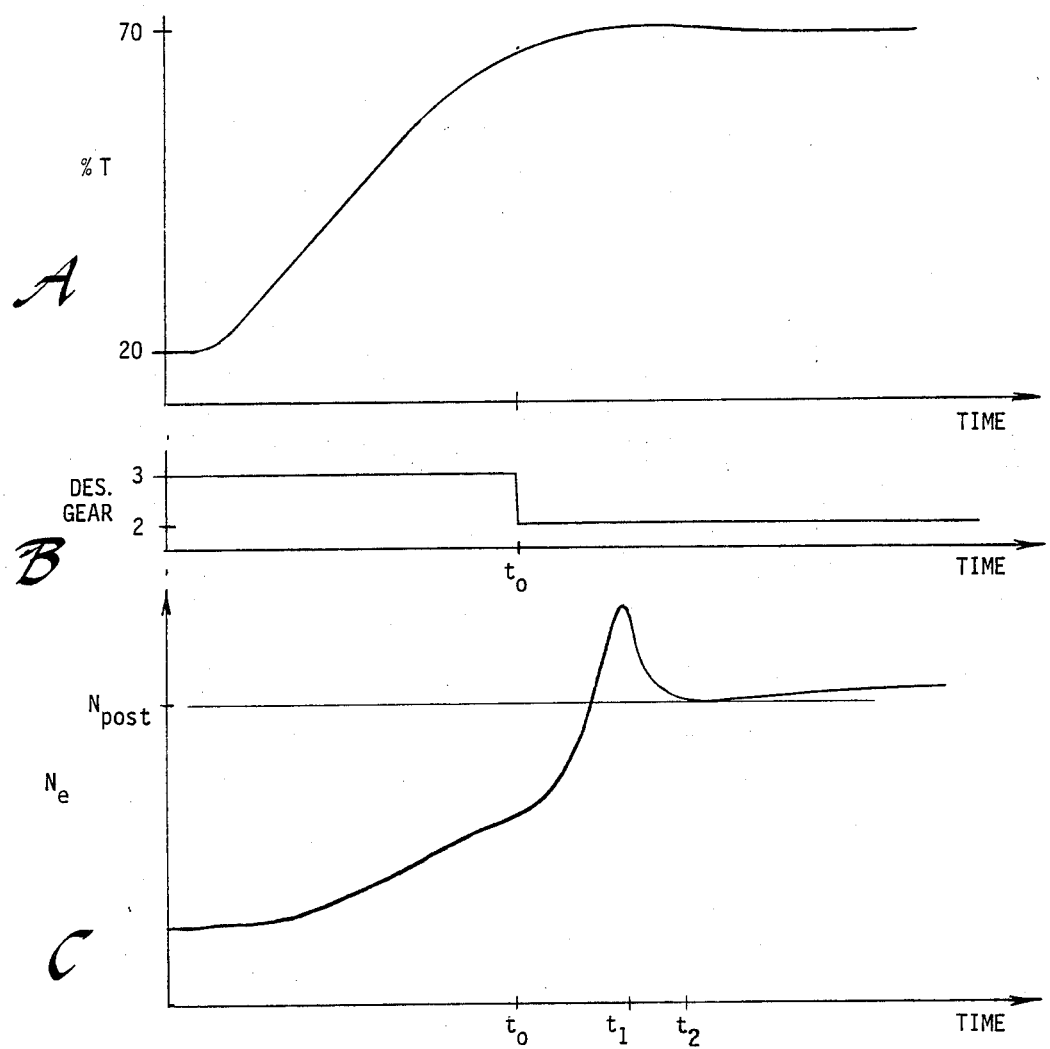
FIG. 2 is a graphical representation of a clutch-to-clutch downshift without the control of this invention.

The graphs of FIG. 2 represent the operation of a motor vehicle drive train where the transmission is calibrated to provide high quality shifting at relatively high altitudes, but the vehicle is operated at relatively low altitudes. The throttle position (%T), the desired gear ratio and the engine speed ($N_e$) are depicted in graphs A, B and C, respectively on a common time base.

A ratio shift is commanded at time $t_0$ in response to the increased position of the engine throttle 20 as seen in graph A. Shortly thereafter, the active or off-going clutch element is released, permitting the engine speed to increase toward a post-shift value $N_{post}$. Since the engine is operating at relatively low altitudes, the actual performance level is substantially higher than the level upon which the transmission calibration is based. As a result, the engine speed increases very rapidly and overshoots the post-shift level $N_{post}$ as indicated at time $t_1$. At such time the apply of the oncoming or third gear clutch pulls the engine speed $N_e$ back to the post-shift value $N_{post}$, such level being finally achieved at time $t_2$.

The shift described above is unacceptable both in terms of driver perception due to the engine flare and in terms of the excessive slippage and wearing of the clutch elements. The opposite effect occurs in an vehicle where the transmission is calibrated for low altitude engine performance levels when the vehicle is operated at relatively high altitudes. In such event, the engine performance level is lower than the value upon which the transmission calibration is based and an excessively harsh shift results.

Figure 3:
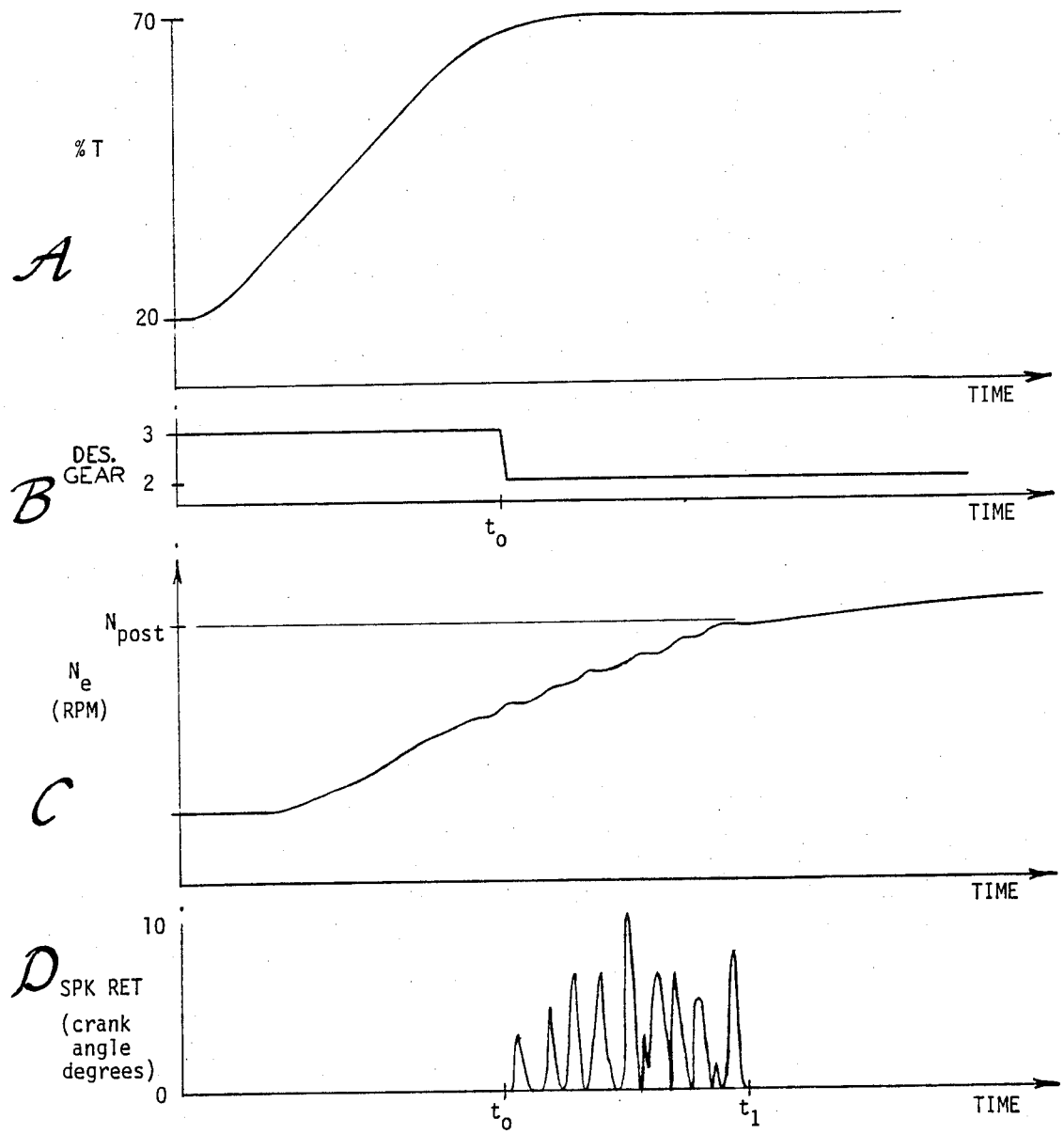
FIG. 3 is a graphical representation of a clutch-to-clutch downshift utilizing the control of the present invention.

FIG. 3 is a graphical representation of a clutch-to-clutch downshift performed utilizing the spark retard control functions of this invention. The engine throttle position (%T), the desired gear, the engine speed $N_e$ and the amount of spark retard (SPK RET) are depicted in graphs A, B, C and D, respectively on a common time base. As in the example of FIG. 2, the shift is initiated at time $t_0$ in response to the increase in the position of the engine throttle 20 as depicted in graph A. Also as in FIG. 2, the transmission 14 is calibrated based on a relatively low engine performance level as would be encountered when operating the vehicle at relatively high altitudes, but the vehicle is actually being operated at relatively low altitudes.

According to the present invention, the actual engine acceleration (that is the slope of the engine speed trace of graph C) is monitored in the course of the shift, and the engine spark timing is selectively retarded from its normal value by the amount indicated in graph D to drive the actual engine acceleration into correspondence with a commanded acceleration value which would occur under high altitude operating conditions. As a result, the actual performance level of the engine corresponds to the performance level upon which the transmission calibration is based and high quality shifting is achieved regardless of the actual engine performance variations. In the illustrated example, the spark retard activity begins at time $t_0$ when the shift is commanded and ends at $t_1$ when the engine speed has achieved its post-shift value $N_{post}$.

As will be well known to those skilled in the art of vehicle drive train control, the transmission calibrations referred to herein are carried out in a conventional manner through valve sizing and the suitable selection of various spring constants and hydraulic timing devices to achieve the desired shift timing and progression.

Figure 4:
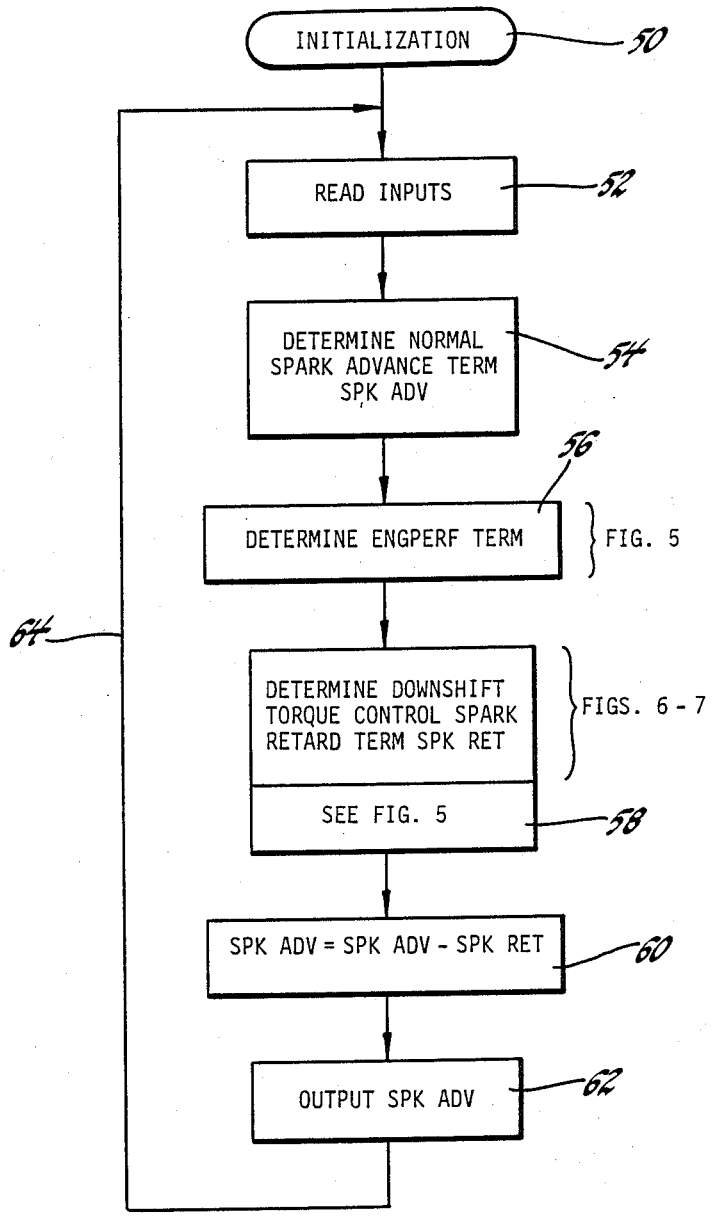
FIGS. 4–7 are flow diagrams representative of computer program instructions executed by the computer based engine control unit of FIG. 1 in carrying out the control functions of this invention.
Figure 5:
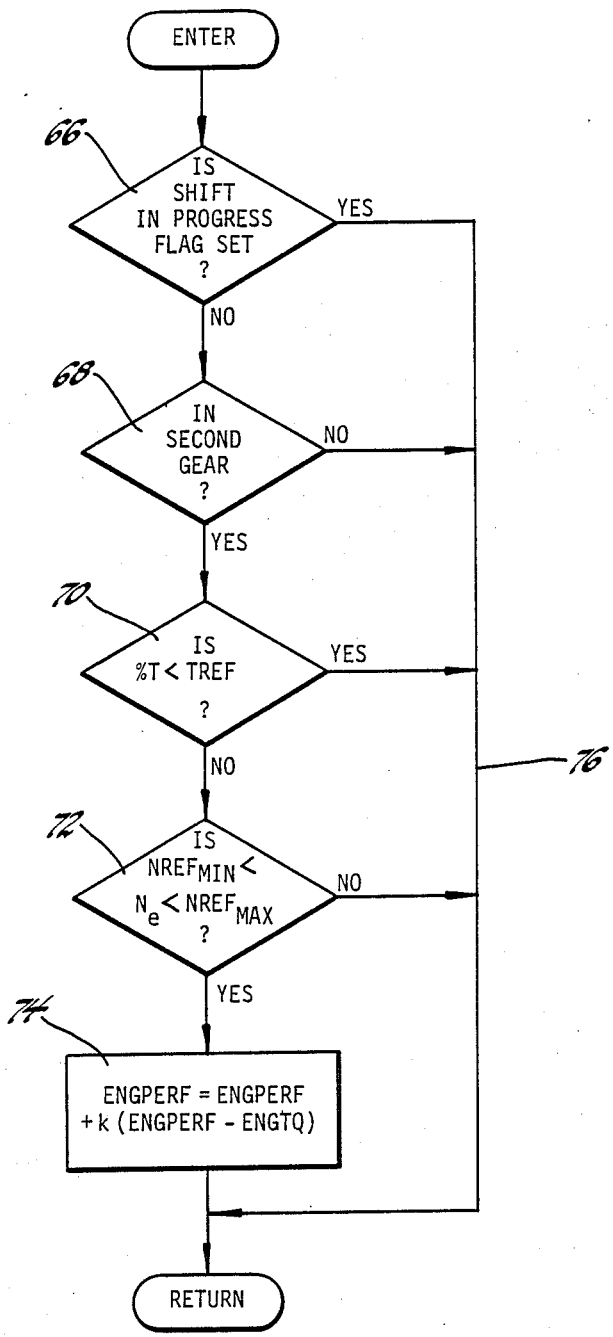
Figure 6:
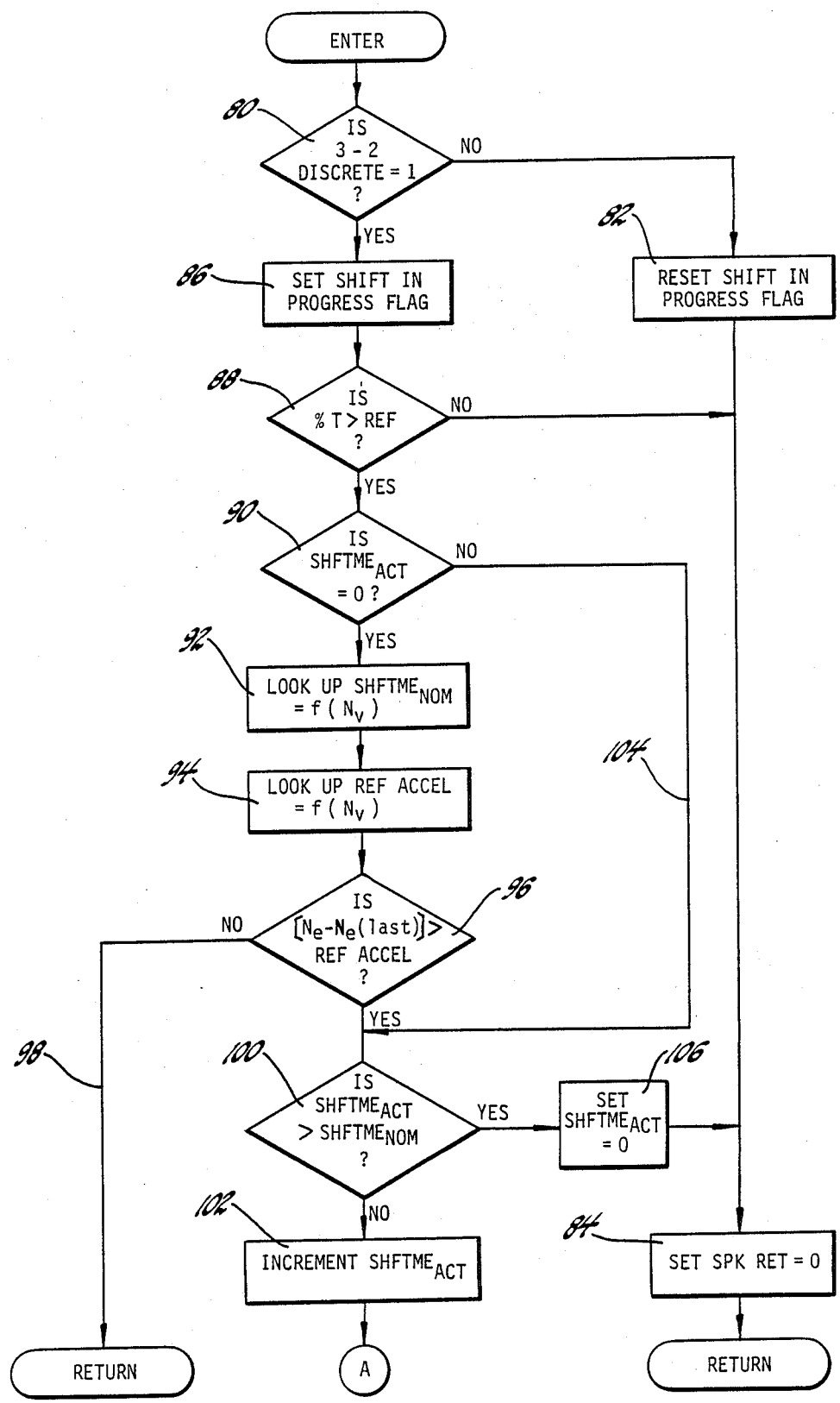
Figure 7:
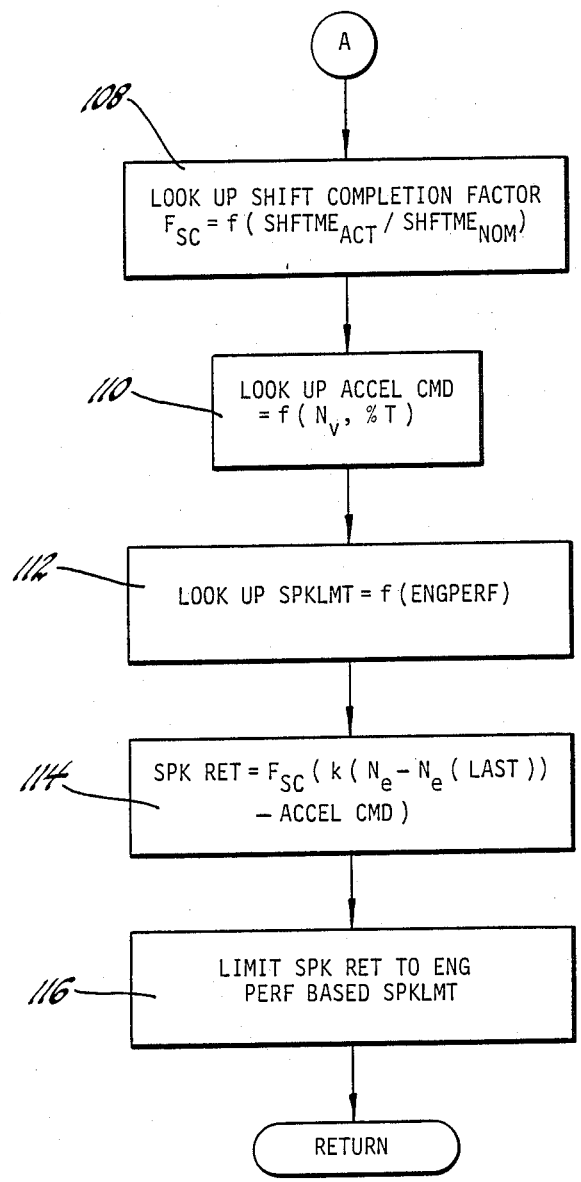

FIGS. 4–7 depict flow diagrams representative of computer program instructions executed by the microcomputer based engine control unit 30 of FIG. 1 in carrying out the control functions of this invention. The flow diagram of FIG. 4 represents executive or main loop program which directs the operation of a number of subroutines for performing various tasks. The flow diagrams of FIGS. 5–7 represent the subroutines which are pertinent of the control functions of this invention as indicated in FIG. 4.

Referring now more particularly to the main loop flow diagram of FIG. 4, the reference numeral 50 generally designates a series of program instructions executed at the initiation of each period of vehicle operation for initializing the various registers, timers and variables stored in the control unit 30. Thereafter, the instruction blocks 52–62 are repeatedly and sequentially executed as indicated by the flow diagram lines.

The various input parameters including the engine speed $N_e$, the throttle position %T and the output speed $N_o$ are read by the control unit 30 indicated by the block 52. Thereafter, the normal or non-shifting spark advance term SPK ADV is determined using a conventional formulation as indicated at block 54. Then an engine performance term ENG PERF is determined as indicated at the block 56 and as described in more detail in the flow diagram of FIG. 5. The downshift torque control spark retard term SPK RET is then determined as indicated at the block 58 and as described in further detail in the flow diagrams of FIGS. 6 and 7. Thereafter, the blocks 60 and 62 are executed to compute and apply a spark advance term SPK ADV to the EST unit 26 via line 28 according to the difference between the spark advance and spark retard terms SPK ADV and SPK RET computed at instruction blocks 54 and 58, respectively. The above-described sequence of operations is repetitively executed as indicated by the flow diagram line 64.

Referring now to the engine performance routine of FIG. 5, the decision blocks 66–72 define the operating conditions for enabling an update of the engine performance term ENG PERF. The term ENG PERF is only updated if a shift is not in progress (block 66), if the transmission 14 is still in second gear (block 68), if the position of the engine throttle 20 is at least as great as a predetermined reference TREF (block 70), and if the engine speed $N_e$ is in a window defined by relatively low and high engine speed references $NREF_{MIN}$ and $NREF_{MAX}$. If the above conditions are met, the instruction block 74 is executed to update the value of the engine performance term ENG PERF by the quantity K(ENG PERF−ENG TQ). The term ENG TQ is representative of the engine output torque; it is empirically determined and stored in control unit 30 as a function of the engine air/fuel ratio, airflow, speed, and coolant temperature. The computation performed at instruction block 74 will be recognized by those skilled in the art as a first order lag filter of the engine torque term ENG TQ.

If any of the conditions defined by the blocks 66–72 is not met, the execution of the instruction block 74 is skipped as indicated by the flow diagram line 76. The engine performance term ENG PERF is used in the determination of the spark retard term SPK RET as described below in reference to FIG. 7.

Referring now to flow diagram of FIGS. 6 and 7, the decision block 80 is first executed to determine if a 3-2 downshift has been enabled as indicated by the status of a discrete status bit. If not, the instruction blocks 82 and 84 are executed to reset the SHIFT IN PROGRESS flag, and to set the spark retard term SPK RET to zero. If a 3-2 downshift has been enabled, the instruction block 86 is executed to set the SHIFT IN PROGRESS flag. If the position of the engine throttle 20 is greater than a relatively low reference position as determined as decision block 88, the decision block 90 is executed to determine if the actual shift time ($SHFTME_{ACT}$) is equal to zero. If so, the shift has just started and the blocks 92-96 are executed to initialize the shift parameters and to detect the onset of engine acceleration due to the shift. The nominal shift time (SHFTME$_{NOM}$) is determined at block 92 as a predefined function of the vehicle speed N$_v$. A relatively low reference acceleration REF ACCEL is determined at block 94 as a function of the vehicle speed N$_v$. If the change in engine speed N$_e$ over one loop time is less than or equal to the reference acceleration value REF ACCEL (as determined at decision block 96), the shift has not sufficiently progressed to initiate the spark retard control and the remainder of the routine is skipped as indicated by the flow diagram line 98.

If the engine speed difference over one loop time exceeds the reference acceleration REF ACCEL, the shift has progressed sufficiently to permit spark retard control and the decision block 100 is executed to determine if the actual shift time SHFTME$_{ACT}$ is greater than the nominal shift time SHFTME$_{NOM}$ determined at block 92. Initially the decision block 100 would be answered in the negative, signaling the execution of instruction block 102 to increment the actual shift time term SHFTME$_{ACT}$. In a subsequent pass through the loop, the decision block 90 would be answered in the affirmative, and the execution of the blocks 92-96 would be skipped as indicated by the flow diagram line 104. Once the actual shift time SHFTME$_{ACT}$ exceeds the nominal shift time SHFTME$_{NOM}$ the decision block 100 is answered in the affirmative and the instruction blocks 106 and 84 are executed to set the actual shift time SHFTME$_{ACT}$ and the spark retard term SPK RET to zero.

Once it is determined that the actual shift time SHFTME$_{ACT}$ as less than or equal to the nominal shift time SHFTME$_{NOM}$ and the actual shift time has been incremented, the control unit 30 executes the blocks 108-116 of FIG. 7 as indicated by the circled letter A in FIGS. 6 and 7. At block 108 a shift completion factor FSC is determined as a function of the ratio SHFTME$_{ACT}$/SHFTME$_{NOM}$, or the percent of shift time completion. At block 110, the acceleration command ACCEL CMD is determined as a function of the vehicle speed N$_v$ and the throttle position %T. At block 112, the control unit 30 determines an ENGPERF-based limit, SPK LMT.

At block 114, the spark retard term SPK RET is determined as a function of the shift completion factor F$_{SC}$ from block 108 and the difference between the actual acceleration [N$_e$−N$_e$(LAST)] and the commanded acceleration ACCEL CMD. The shift completion factor F$_{SC}$ operates as a gain term. For given difference between the actual and scheduled engine acceleration levels, there is a relatively large amount of spark retard at the initiation of the shift, and progressively smaller amounts of spark retard as the shift nears its nominal completion.

At block 116, the spark retard term SPK RET determined at block 114 is limited to the spark retard limit SPK LMT, completing the routine. The spark retard limit SPK LMT is scheduled in relation to a filtered indication of the engine torque as described above. It permits a relatively large amount of spark retard to be commanded at high engine torque, and limits the amount commanded retard to a relatively low value at low engine torque. This prevents the spark retard control from reducing the engine torque to an undesirably low level which would result in rapid application of the oncoming clutch.

In the above manner, the spark timing of engine 12 is controlled in closed loop fashion in relation to the difference between the actual engine acceleration and an engine acceleration specified in relation to a standard engine performance level upon which the transmission calibration is based. As a result, the engine performance level during transmission shifting substantially conforms to the performance level upon which the calibration of the transmission 14 is based, and shift quality is not compromised by variations in the engine performance level.

While this invention has been defined in relation to the illustrated embodiment, it will be understood that various modifications thereto will occur to those skilled in the art and that systems incorporating such modifications may fall within the scope of this invention which is defined by the appended claims.

The embodiments of the invention in which an exclusive property or privilege is claimed are defined as follows:

1. In a motor vehicle including a spark ignition internal combustion engine adapted to drive the vehicle through an automatic shift transmission calibratable to provide acceptable shift quality at a specified engine performance level, a method of operation which avoids degradation of transmission shift quality due to variations in the engine performance level, the method comprising the steps of:

calibrating the transmission to provide acceptable shift quality at a relatively low specified engine performance level;

predefining engine acceleration levels that would occur during shifting of the transmission at an engine performance level corresponding to said relatively low specified level;

measuring an actual engine acceleration level in the course of transmission shifting; and during shifting of the transmission, retarding the engine spark timing so as to bring the actual engine acceleration level into correspondence with the predefined engine acceleration level, thereby bringing the actual, engine performance level into correspondence with the relatively low specified engine performance level for which the transmission is calibrated.

2. The method set forth in claim 1, including the step of:

limiting the amount of spark retard in relation to a filtered indication of an engine output torque to thereby prevent the engine output torque from being reduced to a level which would result in undesirably rapid completion of the shift.

3. The method set forth in claim 1, including the step of:

scheduling the gain of the spark retard in relation to the percent completion of the shift such that a given difference between the actual and predefined engine acceleration levels results in a relatively large amount of spark retard at the initiation of the shift, and progressively smaller amounts of spark retard as the shift nears its nominal completion.

4. In a motor vehicle including a spark ignition internal combustion engine adapted to drive the vehicle through an automatic shift transmission calibratable to provide acceptable shift quality at a specified engine performance level, and an engine control normally effective to schedule the engine spark timing for producing substantially optimum engine performance, a method of operation which avoids degradation of transmission shift quality due to variations in the engine performance level, the method comprising the steps of:
- calibrating the transmission to provide acceptable shift quality at a less than optimum specified engine performance level;
- predefining engine acceleration levels that would occur during shifting of the transmission at an engine performance level corresponding to said less than optimum specified level;
- measuring an actual engine acceleration level in the course of transmission shifting; and
- during shifting of the transmission, retarding the engine spark timing from the value normally scheduled by said engine control so as to bring the actual engine acceleration level into correspondence with the predefined engine acceleration level, thereby bringing the actual engine performance level into correspondence with the less than optimum specified engine performance level for which the transmission is calibrated.

5. The method set forth in claim 4, wherein the step of retarding the engine spark timing is initiated when the progression of the transmission shift causes the measured engine acceleration to exceed a reference engine acceleration value.

6. The method set forth in claim 4, including the step of:
- returning the spark timing to the value normally scheduled by said engine control when the elapsed time of the shift reaches the nominal time required for substantial shift completion.

* * * * *